US011596820B2

(12) United States Patent
Cockerham et al.

(10) Patent No.: US 11,596,820 B2
(45) Date of Patent: Mar. 7, 2023

(54) METHOD FOR MANUFACTURING A FLAME ARRESTOR

(71) Applicant: Emerson Process Management Regulator Technologies Tulsa, LLC, Tulsa, OK (US)

(72) Inventors: John D. Cockerham, Tulsa, OK (US); James Myers, Tulsa, OK (US); Travis Ellison, Tulsa, OK (US)

(73) Assignee: Emerson Process Management Regulator Technologies Tulsa, LLC, Tulsa, OK (US)

(*) Notice: Subject to any disclaimer, the term of this patent is extended or adjusted under 35 U.S.C. 154(b) by 545 days.

(21) Appl. No.: 16/737,741

(22) Filed: Jan. 8, 2020

(65) Prior Publication Data
US 2020/0139173 A1  May 7, 2020

Related U.S. Application Data

(62) Division of application No. 15/253,437, filed on Aug. 31, 2016, now abandoned.

(51) Int. Cl.
| *A62C 4/02* | (2006.01) |
| *A62C 4/00* | (2006.01) |
| *B33Y 80/00* | (2015.01) |
| *A62C 3/06* | (2006.01) |

(Continued)

(52) U.S. Cl.
CPC ............... *A62C 4/02* (2013.01); *A62C 3/065* (2013.01); *A62C 4/00* (2013.01); *B33Y 10/00* (2014.12); *B33Y 80/00* (2014.12); *B32B 37/14* (2013.01)

(58) Field of Classification Search
CPC ............................. A62C 3/065; B33Y 10/00
See application file for complete search history.

(56) References Cited

U.S. PATENT DOCUMENTS

| 258,749 A | 5/1882 | Hall |
| 290,559 A | 12/1883 | Finnigan |
| 802,380 A | 10/1905 | Emerson et al. |

(Continued)

FOREIGN PATENT DOCUMENTS

| CN | 1483491 A | 3/2004 |
| CN | 104623832 A | 5/2015 |

(Continued)

OTHER PUBLICATIONS

First Examination Report for India Application No. 201917008786, dated Dec. 1, 2020.

(Continued)

*Primary Examiner* — Jason L Vaughan
*Assistant Examiner* — Amanda Kreiling
(74) *Attorney, Agent, or Firm* — Marshall, Gerstein & Borun LLP

(57) ABSTRACT

A method of custom manufacturing a flame arrestor assembly configured to extinguish a flame propagating therethrough. The method includes creating a customized flame cell using an additive manufacturing technique, which generally includes forming a body and forming one or more channels in the body. The one or more channels define a flow path configured to transfer heat from a flame front propagating through the flow path to the body. The method also includes providing a housing, and securely arranging the flame cell within the housing.

17 Claims, 11 Drawing Sheets

(51) Int. Cl.
*B33Y 10/00* (2015.01)
*B32B 37/14* (2006.01)

(56) References Cited

U.S. PATENT DOCUMENTS

| | | | |
|---|---|---|---|
| 840,992 A | 1/1907 | Cohn | |
| 875,481 A | 12/1907 | Wilson | |
| 958,944 A | 5/1910 | Steward | |
| 1,011,988 A | 12/1911 | Moeller | |
| 1,134,838 A | 4/1915 | Gaumer | |
| 1,259,029 A | 3/1918 | Lucke | |
| 1,701,805 A | 2/1929 | Dunn et al. | |
| 1,755,624 A | 4/1930 | Yount | |
| 2,087,170 A | 7/1937 | Stephenson | |
| 2,376,933 A | 5/1945 | Moran | |
| 2,388,395 A | 11/1945 | Duggan | |
| 2,420,599 A | 5/1947 | Jurs | |
| 3,287,094 A | 11/1966 | Brownell | |
| 3,356,255 A | 12/1967 | Zavertnik et al. | |
| 3,490,644 A | 1/1970 | Redburn | |
| 3,650,431 A | 3/1972 | Stewart | |
| 3,661,295 A | 5/1972 | Grunwald et al. | |
| 3,711,259 A | 1/1973 | Gurney | |
| 3,804,292 A | 4/1974 | Chiti | |
| 4,015,954 A | 4/1977 | Reed | |
| 4,192,657 A | 3/1980 | Worrell | |
| 4,361,190 A | 11/1982 | Szego | |
| 4,387,829 A | 6/1983 | Berry | |
| 5,145,360 A | 9/1992 | Rajewski | |
| 5,211,554 A | 5/1993 | Rajewski | |
| 5,246,130 A | 9/1993 | Mondt et al. | |
| 5,415,233 A | 5/1995 | Roussakis | |
| 6,699,035 B2 | 3/2004 | Brooker | |
| 7,918,664 B2 | 4/2011 | Leinemann | |
| 8,573,289 B1 | 11/2013 | Roper et al. | |
| 9,987,508 B2 | 6/2018 | Cockerham et al. | |
| 2002/0129947 A1 | 9/2002 | Leinemann | |
| 2003/0031966 A1 | 2/2003 | Berry et al. | |
| 2003/0044740 A1 | 3/2003 | Brooker | |
| 2003/0165638 A1 | 9/2003 | Louks et al. | |
| 2006/0008755 A1 | 1/2006 | Leinemann et al. | |
| 2007/0269356 A1 | 11/2007 | Mori et al. | |
| 2008/0176177 A1 | 7/2008 | Leinemann | |
| 2008/0271814 A1 | 11/2008 | Wilton et al. | |
| 2009/0277655 A1 | 11/2009 | DeCourcy et al. | |
| 2009/0321045 A1 | 12/2009 | Hernon et al. | |
| 2010/0147857 A1 | 6/2010 | Huang | |
| 2010/0218958 A1 | 9/2010 | Cooling et al. | |
| 2010/0291401 A1 | 11/2010 | Medina et al. | |
| 2012/0077992 A1 | 3/2012 | Hutter et al. | |
| 2012/0273239 A1* | 11/2012 | Brennan | A62C 4/00 169/45 |
| 2013/0206759 A1 | 8/2013 | Wurz et al. | |
| 2014/0020783 A1 | 1/2014 | Zazovsky et al. | |
| 2015/0300861 A1 | 10/2015 | Regen et al. | |
| 2015/0345298 A1 | 12/2015 | Mongillo et al. | |
| 2016/0056511 A1 | 2/2016 | Schmid et al. | |
| 2016/0136464 A1 | 5/2016 | Strybos | |
| 2016/0136467 A1 | 5/2016 | Strybos | |
| 2017/0021209 A1 | 1/2017 | Damazo et al. | |
| 2017/0234143 A1 | 8/2017 | Snyder | |
| 2017/0319881 A1 | 11/2017 | Barz | |
| 2017/0368392 A1 | 12/2017 | Smith et al. | |
| 2018/0056100 A1 | 3/2018 | Cockerham et al. | |
| 2018/0056101 A1 | 3/2018 | Cockerham et al. | |
| 2018/0078802 A1 | 3/2018 | Licht et al. | |
| 2018/0187984 A1 | 7/2018 | Manzo | |

FOREIGN PATENT DOCUMENTS

| | | |
|---|---|---|
| DE | 11 25 847 B | 3/1962 |
| EP | 3081266 A2 | 10/2016 |
| EP | 3120900 A1 | 1/2017 |
| RU | 2578116 C2 | 3/2016 |
| SU | 1260007 A1 | 9/1986 |
| WO | WO-2004/108219 A1 | 12/2004 |
| WO | WO-2010/129389 A1 | 11/2010 |

OTHER PUBLICATIONS

Notification of the First Office Action for Chinese Application No. 201710769676.0, dated Jun. 3, 2020.
Notification of the First Office Action for Chinese Application No. 201710770232.9, dated Jul. 21, 2020.
Office Action for Canadian Application No. 3,035,098, dated Feb. 5, 2020.
Office Action for European Application No. 17761998.8, dated Feb. 25, 2020.
Office Action for Korean Application No. 10-2019-7009305., dated Jun. 12, 2019.
Office Action for Russian Application No. 2019106369, dated Dec. 8, 2020.
Office Action for European Application No. 17761998.8, dated Nov. 4, 2020.
International Search Report and Written Opinion, corresponding International Application No. PCT/US2017/048356, dated Dec. 19, 2017.
International Preliminary Reporton Patentability for Application No. PCT/US2017/048329, dated Mar. 5, 2019.
International Preliminary Reporton Patentability for Application No. PCT/US2017/048356, dated Mar. 5, 2019.
International Search Report and Written Opinion, corresponding International Application No. PCT/US2017/048329, dated Jan. 29, 2018.
Partial International Search Report for Application No. PCT/US2017/048239 dated Nov. 3, 2017.

* cited by examiner

METHOD FOR MANUFACTURING A FLAME ARRESTOR

CROSS-REFERENCE TO RELATED APPLICATION

This application is a divisional of U.S. patent application Ser. No. 15/253,437, entitled "Method for Manufacturing a Flame Arrestor," and filed Aug. 31, 2016, the entire disclosure of which is hereby incorporated by reference herein.

FIELD OF THE DISCLOSURE

The present disclosure generally relates to flame arrestors, and, more particularly, to a method of manufacturing a flame arrestor.

BACKGROUND

Flame arrestors can be employed in applications, e.g., chemical, refining, petrochemical, upstream oil and gas, landfill, biogas applications, and the like, involving flammable vapors so as to prevent the flammable vapors from being ignited by potential ignition sources (e.g., flares, flames, exothermic chemical reactions, failed compressor bearings, etc.), which could lead to a fire, a deflagration, and/or a detonation. Flame arrestors, which may, for example, be installed in a pipeline between a fuel source (e.g., one or more storage tanks) and an ignition source (e.g., a flare, a flame), include flow paths that facilitate fluid flow therethrough, but, at the same time, remove heat from a flame front (which may also be referred to as the flame) as it attempts to flow through these flow paths. Flame arrestors thus prevent the flame front from reaching the fuel source, thereby preventing ignition of the fuel source, and, in turn, injuries, environmental issues, and/or damage to equipment and facilities that may result from such an ignition.

With conventional manufacturing processes, flame arrestors, such as the flame arrestor 100 of an element assembly shown in FIGS. 1A and 1B, include one or more flame cells 104 that are installed (e.g., welded, captured by welded rings or crossbars) in the housing 108 and feature a plurality of narrow, linear flame paths 112 that serve to remove heat from a flame front that attempts to flow therethrough, as described above. As best illustrated in FIG. 1B, each of the flame cells 104 employs multiple layers 116 of crimped metal ribbons that are wound around a core 120 and define or create a plurality of triangularly-shaped openings 124, which in turn define or create the linear flame paths 112. In some cases, e.g., when the flame arrestor 100 includes multiple flame cells 104, as is the case in FIGS. 1A and 1B (which depicts four flame cells 104), a sheet of expanded metal or a screen 128 must be installed within the housing 108 between each pair of adjacent flame cells 104 so as to create a level of turbulence that ensures adequate heat removal as the flame front travels through the flame arrestor 100.

SUMMARY

In accordance with a first exemplary aspect of the present invention, a flame cell is provided. The flame cell includes a body and one or more channels formed in the body. The one or more channels define a non-linear flow path, and the body is configured to remove heat from a flame front propagating through the non-linear flow path.

In accordance with a second exemplary aspect of the present invention, a flame arrestor is provided. The flame arrestor includes a housing, and a flame cell arranged in the housing. The flame cell includes a means for inducing turbulence in a flame propagating through the flame arrestor.

In accordance with a third exemplary aspect of the present invention, a method of custom manufacturing a flame arrestor assembly is provided. The method includes creating a customized flame cell using an additive manufacturing technique, which generally includes forming a body and forming one or more channels in the body. The one or more channels define a flow path configured to transfer heat from a flame front propagating through the flow path to the body. The method also includes providing a housing, and securely arranging the flame cell within the housing.

In further accordance with any one or more of the foregoing first, second, and third exemplary aspects, a flame cell, a flame arrestor, and or a method of manufacturing a flame arrestor assembly may include any one or more of the following further preferred forms.

In one preferred form, one or more of the channels are curved.

In another preferred form, the non-linear flow path has a helical shape.

In another preferred form, at least one of the channels includes a component oriented substantially perpendicular to a longitudinal axis of the flame cell.

In another preferred form, each of the channels has a circular cross-sectional shape.

In another preferred form, each of the channels has an irregular cross-sectional shape.

In another preferred form, the means for inducing turbulence comprises a plurality of channels that define a non-linear flow path.

In another preferred form, the flame cell includes a body made of a metallic material, the channels being formed in the body.

In another preferred form, a second flame cell is arranged in the housing, the second flame cell including a second means for inducing turbulence in the flame propagating through the flame arrestor.

In another preferred form, the flame cell and the second flame cell are not separated by expanded metal.

In another preferred form, the second means for inducing turbulence includes a second plurality of channels that define a second non-linear flow path different from the non-linear flow path.

In another preferred form, each of the channels has a circular, rectangular, or irregular cross-sectional shape.

In another preferred form, the means for inducing turbulence is not a sheet of expanded metal disposed in the flame cell.

In another preferred form, the act of creating the customized flame cell includes forming a void in the body, and the method further includes arranging a sensor within the void.

In another preferred form, the act of providing the housing includes creating the housing using the additive manufacturing technique.

In another preferred form, the method further includes creating an additional customized flame cell using the additive manufacturing technique, and securely arranging the additional flame cell within the housing.

In another preferred form, the additive manufacturing technique includes 3D printing.

In another preferred form, the act of forming the one or more channels includes forming one or more curved channels in the body such that the flow path is at least partially non-linear.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is generally directed to a method of manufacturing a flame arrestor that removes heat from a flame front in a more efficient manner and requires less maintenance than conventionally manufactured flame arrestors such as the flame arrestor 100. The method described herein utilizes cutting edge manufacturing techniques, like additive manufacturing, to facilitate custom manufacturing of the flame arrestor, as well as various components of the flame arrestor (e.g., one or more flame cells), such that a number of different unique and complex flow paths, e.g., non-linear flow paths, can be developed and incorporated into the resulting flame arrestor in place of the standard, linear flow paths utilized in conventional flame arrestors, depending upon the given application. Unique and complex flow paths promote or induce turbulent flow and encourage nearly continuous (or at least increased) heat transfer from a flame front to the flame arrestor, such that flame arrestors produced according to the method of manufacturing described herein represent an improvement over known flame arrestors.

Beneficially, these unique and complex flow paths also obviate the need for screens or expanded metal, which are sometimes needed in conventional flame arrestors to promote turbulent flow but undesirably result in a large pressure drop across the flame arrestor and may, in some cases, plug the flame cells. In other words, the method described herein can yield a flame arrestor that induces a greater level of turbulent flow than conventional flame arrestors, without producing the negative effects (i.e., a large pressure drop and increased maintenance due to plugging) caused by turbulence inducing screens or expanded metal. In some cases, the method described herein may also reduce the number of flame cells that need to be utilized in a given flame arrestor, such that less material is required, thereby reducing the weight and/or manufacturing cost of the flame arrestor. This also has the potential benefit of facilitating a shorter flame arrestor (as less flame cells are used), which will in turn reduce pressure drops within the flame arrestor.

Figure 1A:
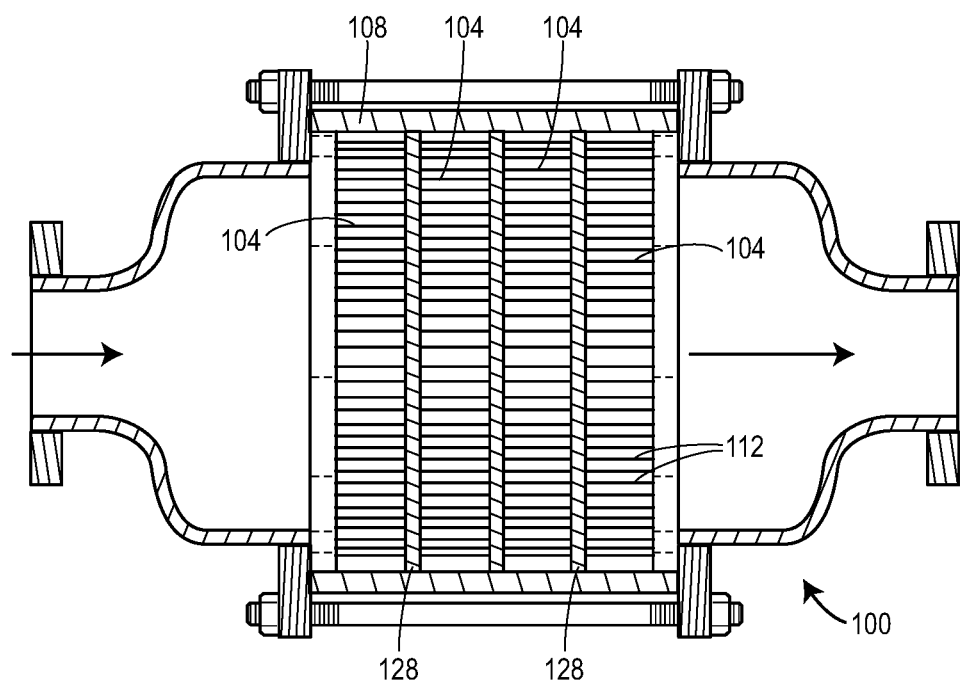
FIG. 1A is a cross-sectional view of a conventional flame arrestor assembly.
Figure 1B:
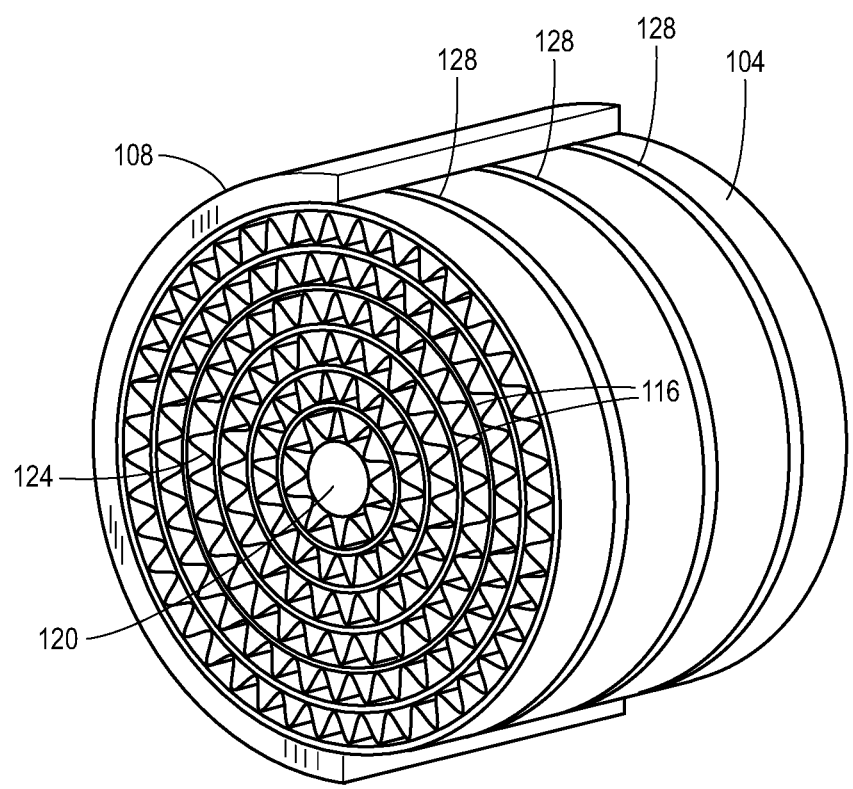
FIG. 1B is a perspective view of a portion of the conventional flame arrestor assembly of FIG. 1A.
Figure 2:
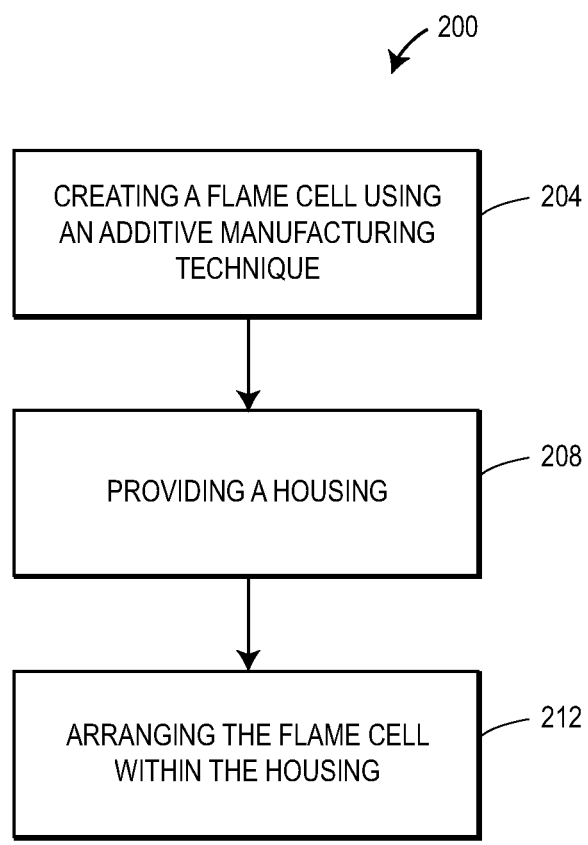
FIG. 2 is a schematic diagram of one example of a process or method according to the teachings of the present disclosure for manufacturing a flame arrestor.

FIG. 2 is a diagram of an example of a method or process 200 according to the teachings of the present disclosure. The method or process 200 schematically depicted in FIG. 2 is a method or process of custom manufacturing a flame arrestor (also referred to herein as a flame arrestor assembly). Like the conventional flame arrestors described above (e.g., the flame arrestor 100), flame arrestors manufactured according to the method or process 200 are configured to remove heat from a flame front, thereby preventing (e.g., extinguishing) a flame from propagating therethrough, but, as described above, does so in a manner that is more efficient and requires less maintenance.

More specifically, the method 200 includes the act 204 of creating a customized flame cell using an additive manufacturing technique. The additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

The act 204 of creating the customized flame cell thus generally includes forming a body and forming one or more channels in the body. The body can be made of one or more suitable materials, such as, for example, stainless steel, aluminum, various alloys (e.g., high nickel alloys), and by virtue of being customizable, can be any number of different shapes and/or sizes. The one or more channels generally define a flow path that is configured to transfer heat from a flame front propagating through the flow path to the body.

Figure 3A:
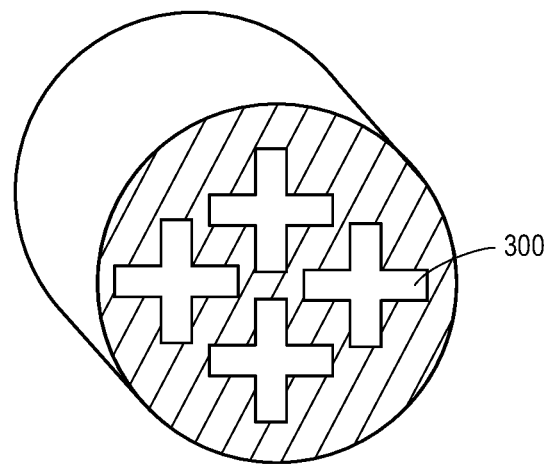
FIG. 3A is an end view of one example of a flame cell manufactured according to the process of FIG. 2 and including channels having a cross-like cross-sectional shape.
Figure 3B:
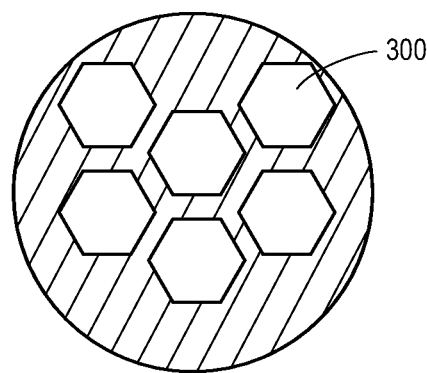
FIG. 3B is an end view of one example of a flame cell manufactured according to the process of FIG. 2 and including channels having a hexagonal cross-sectional shape.
Figure 3C:
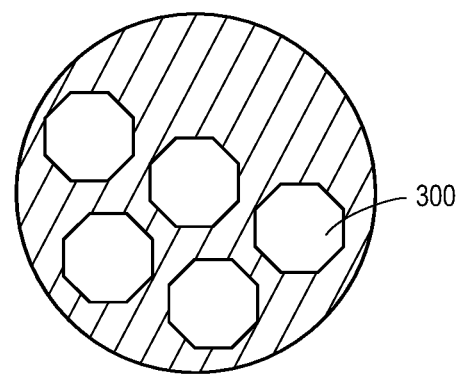
FIG. 3C is an end view of one example of a flame cell manufactured according to the process of FIG. 2 and including channels having an octagonal cross-sectional shape.
Figure 3D:
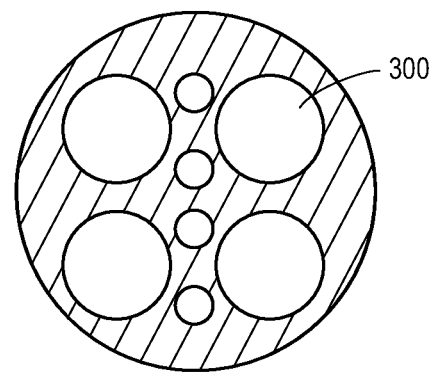
FIG. 3D is an end view of one example of a flame cell manufactured according to the process of FIG. 2 and including channels having a circular cross-sectional shape.
Figure 3E:
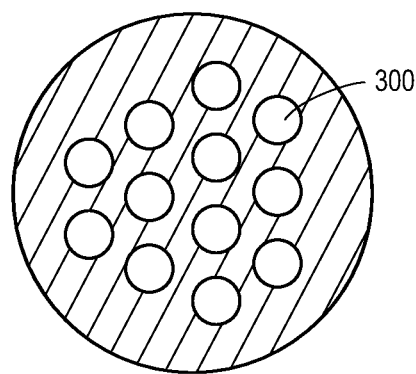
FIG. 3E is an end view of another example of a flame cell manufactured according to the process of FIG. 2 and including channels having a circular cross-sectional shape.
Figure 3F:
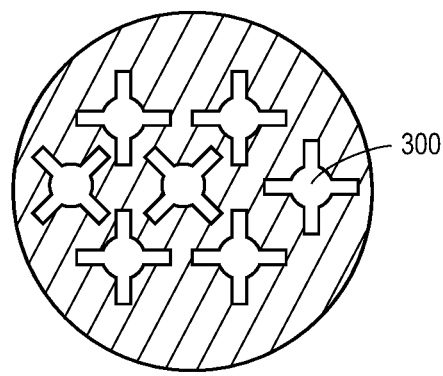
FIG. 3F is an end view of one example of a flame cell manufactured according to the process of FIG. 2 and including channels having an irregularly-shaped cross-section.
Figure 3G:
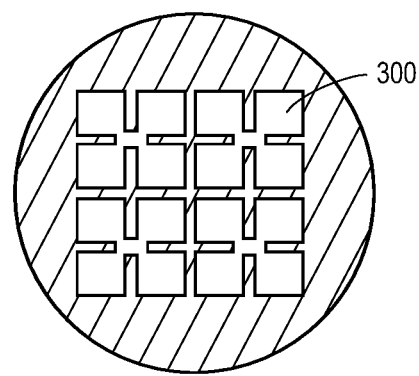
FIG. 3G is an end view of another example of a flame cell manufactured according to the process of FIG. 2 and including channels having an irregularly-shaped cross-section.
Figure 3H:
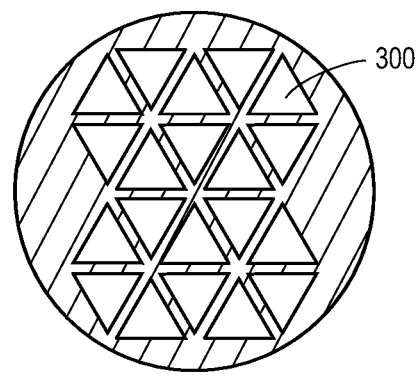
FIG. 3H is an end view of one example of a flame cell manufactured according to the process of FIG. 2 and including channels having a triangular cross-sectional shape and arranged in an alternating pattern.

The one or more channels, which generally extend between opposing ends of the flame cell, can, by virtue of being customizable, have any number of different sizes and/or shapes in cross-section, and/or be arranged in any number of different patterns or arrays. Generally speaking, each of the one or more channels will have a cross-sectional shape that is not limited to being triangular. As examples, FIG. 3A illustrates channels 300 having a cross-like cross sectional shape, FIG. 3B illustrates channels 300 having an hexagonal cross-sectional shape, FIG. 3C illustrates channels 300 having an octagonal cross-sectional shape, FIGS. 3D and 3E each illustrate channels 300 having a circular cross-sectional shape, FIGS. 3F and 3G each illustrate channels 300 having irregularly-shaped cross-sections. Alternatively, each of the channels 300 may have a triangular cross-sectional shape, with those channels 300 arranged in the alternating pattern illustrated in FIG. 3H. Other cross-sectional shapes are possible as well. It will also be appreciated that one or more of the channels may have a different shape and/or size than one or more other channels, as illustrated in, for example, FIG. 3D, wherein all of the channels 300 have a circular shape in cross-section, but some of the channels 300 are larger in diameter than the other channels 300.

As discussed above, the usage of additive manufacturing techniques to custom manufacture the flame cell allows the one or more channels to be formed so as to define a unique and complex, e.g., a non-linear or curved flow path, rather than the standard, linear flow paths utilized in conventional flame arrestors. This is generally accomplished by or via (i) the unique and complex shape of the one or more channels, (ii) rotating the one or more channels about an axis that extends along or is parallel to a centerline of the flame cell, and/or (iii) changing the position of the one or more channels relative to the centerline as the channels extend through the flame cell, such that the one or more channels move away from and/or toward the centerline as the channels extend through the flame cell.

Various portions of the channels may, in turn, be oriented at different angles relative to the axis. As an example, a first portion of one of the channels may be oriented at a first angle relative to the axis, while a second portion of that channel may be oriented at a second angle relative to the axis, the second angle being greater than or less than the first angle. In some cases, one or more portions or components of the channels may be oriented substantially perpendicular or exactly perpendicular relative to the axis of the flame cell. Moreover, while not illustrated herein, different channels may be rotated relative to one another and/or converge toward or diverge away from one another.

Figure 4A:
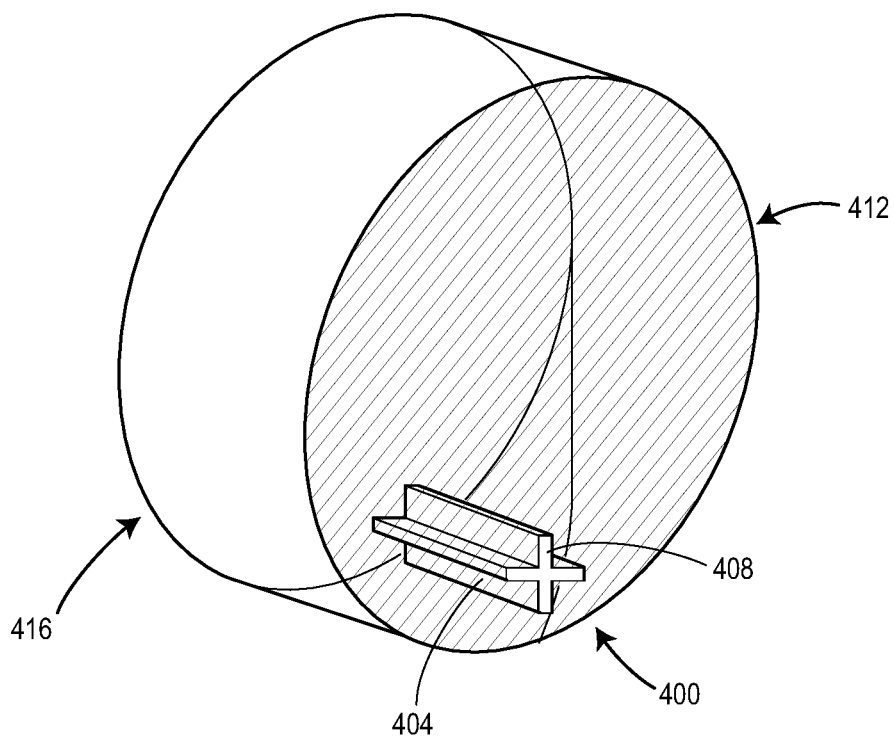
FIG. 4A is a perspective view of a flame cell manufactured according to the process of FIG. 2 and defining a first example of a complex flow path.

FIG. 4A illustrates one example of a flame cell 400 having a unique or complex flow path 404 defined or formed by one or more channels 408 (in this case, one channel 408) having the cross-like cross-sectional shape illustrated in FIG. 3A. As illustrated, the channel 408 extends between a first end 412 of the flame cell 400 and a second end 416 of the flame cell 400 opposite the first end 408.

Figure 4B:
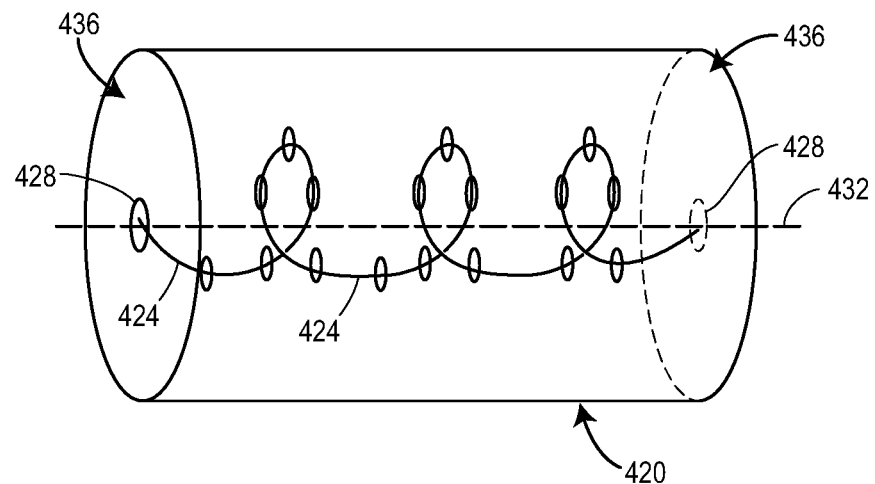
FIG. 4B is a perspective view of a flame cell manufactured according to the process of FIG. 2 and defining a second example of a complex flow path.

FIG. 4B illustrates one example of a flame cell 420 having a non-linear or curved flow path 424 formed by rotating one or more channels 428 (in this case, one channel 428) about a central axis 432 of the flame cell 420. The channel 428 depicted in FIG. 4B has a circular shape in cross-section. As illustrated, the channel 428 is centered on or about the axis 432 at opposing ends 436 of the flame cell 420, but is rotated (e.g., spiraled, wound) about the axis 432 between the ends 436, such that the non-linear flow path 424 takes on a helical form.

Figure 4C:
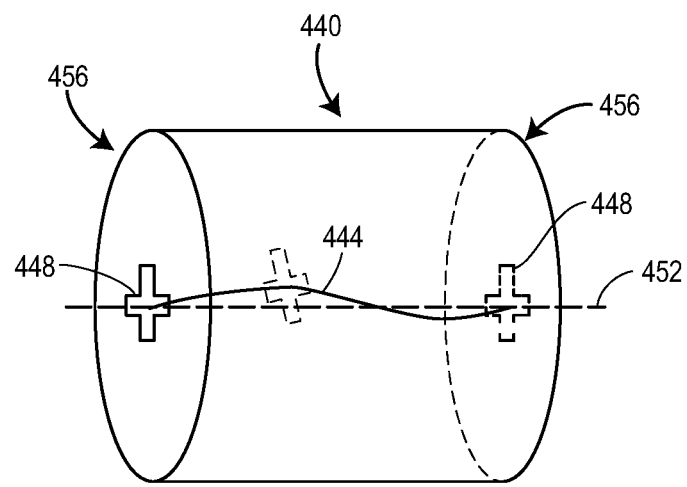
FIG. 4C is a perspective view of a flame cell manufactured according to the process of FIG. 2 and defining a third example of a complex flow path.

FIG. 4C illustrates another example of a flame cell 440 having a non-linear or curved flow path 444 formed by rotating one or more channels 448 (in this case, one channel 448) about a central axis 452 of the flame cell 440. The channel 448 depicted in FIG. 4C has a cross-like shape in cross-section. As illustrated, the channel 448 is centered on or about the axis 452 at opposing ends 456 of the flame cell 440, but is rotated about the axis 452 between the ends 456.

Figure 4D:
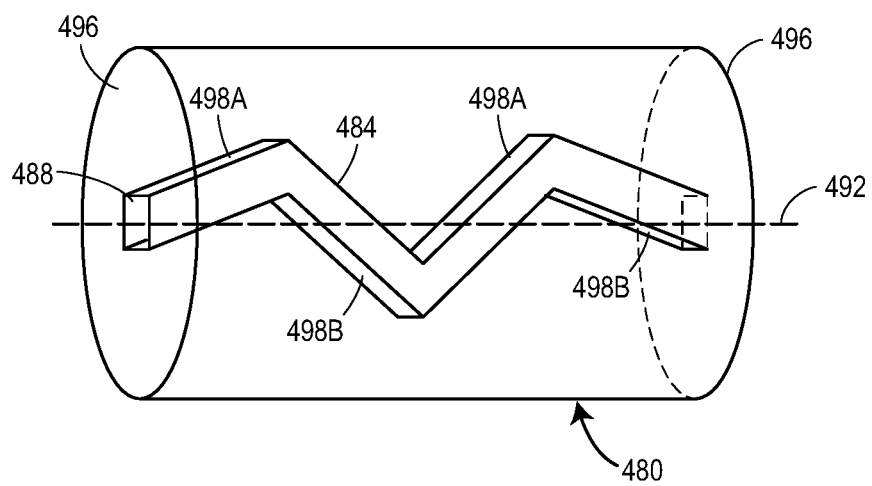
FIG. 4D is a perspective view of a flame cell manufactured according to the process of FIG. 2 and defining a fourth example of a complex flow path.

FIG. 4D illustrates one example of a flame cell 480 having a non-linear or curved flow path 484 formed by changing the position of one or more channels 488 (in this case, one channel 488) about a central axis 492 of the flame cell 480. The channel 488 depicted in FIG. 4D has a substantially rectangular shape in cross-section. As illustrated, the channel 488 is centered on or about the center axis 492 at opposing ends 496 of the flame cell 480, but has two portions 498A that increasingly extend away from the center axis 492 and two portions 498B that increasingly extend toward the center axis 492, such that the flow path 484 zigzags through the flame cell 480.

It will be appreciated that the flame cell can include other unique and complex flow paths depending on the given application. In some cases, the unique and complex flow path can partially include a linear or straight portion, with the remaining portion being curved or non-linear.

In some cases, the act 204 of creating the customized flame cell optionally includes forming a void in the body of the flame cell, and arranging a sensor within the void. The sensor can, for example, be a temperature, photo, infrared, pressure, or other type of sensor. The sensor can, in turn, be communicatively connected (either via a wired connection or a wireless connection) to a controller, thereby allowing the controller and/or a user to remotely monitor the flame cell without having to shut down the system employing the flame cell. This allows the controller and/or the user to, for example, remotely monitor or detect the temperature or pressure within the flame cell (e.g., the temperature of the body, the temperature of the flame front), as well as other parameters and data, as desired.

The method or process 200 also includes the act 208 of providing a housing for the flame cell. The housing generally includes an inlet arranged to be coupled to an upstream component of the pipeline in which the flame arrestor is employed, as well as an outlet arranged to be coupled to a downstream component of the pipeline. The housing also includes a chamber or cavity sized to receive the flame cell, as well as additional components for securely retaining the flame cell within the housing.

In some cases, the act 208 of providing the housing for the flame cell may involve manufacturing the housing using conventional manufacturing techniques, either before, after, or at the same time as the act 204 is performed. In other cases, however, the act 208 of providing the housing for the flame cell may involve creating the housing using one of the additive manufacturing techniques described above. The housing may be created using a different additive manufacturing technique as the flame cell or using the same additive manufacturing technique as the flame cell. In either situation, the housing may be created before, after, or at the same time as the flame cell is created.

The method or process 200 further includes the act 212 of securely arranging the created flame cell within the provided housing, thereby forming the flame arrestor. In some cases, e.g., when the housing is manufactured using conventional techniques, the created flame cell may be secured within the housing using threaded bolts or any other known suitable means. In other cases, e.g., when the housing is manufactured using the same additive manufacturing technique used to manufacture the flame cell, the flame cell can be secured within the housing by printing the flame cell onto the housing (using additive manufacturing), thereby forming a unitary, one-piece flame arrestor.

It will be appreciated that the acts 204, 208, and/or 212 can be performed any number of different times. In some cases, the act 204 can be performed multiple times so as to create multiple (e.g., two, three, four, and so on) flame cells for use in a single housing. Beneficially, because the flame cells will promote greater levels of turbulent flow than conventional flame arrestors, the flame cells can be arranged within the housing, adjacent one another, without having to dispose screens or expanded metal therebetween, as is the case in some conventional flame arrestors. In other cases, the act 204 can be performed multiple (e.g., two, three, four, and so on) times, with the acts 208 and 212 also performed multiple times, so as to create multiple flame arrestors each having a single flame cell.

Figure 5:
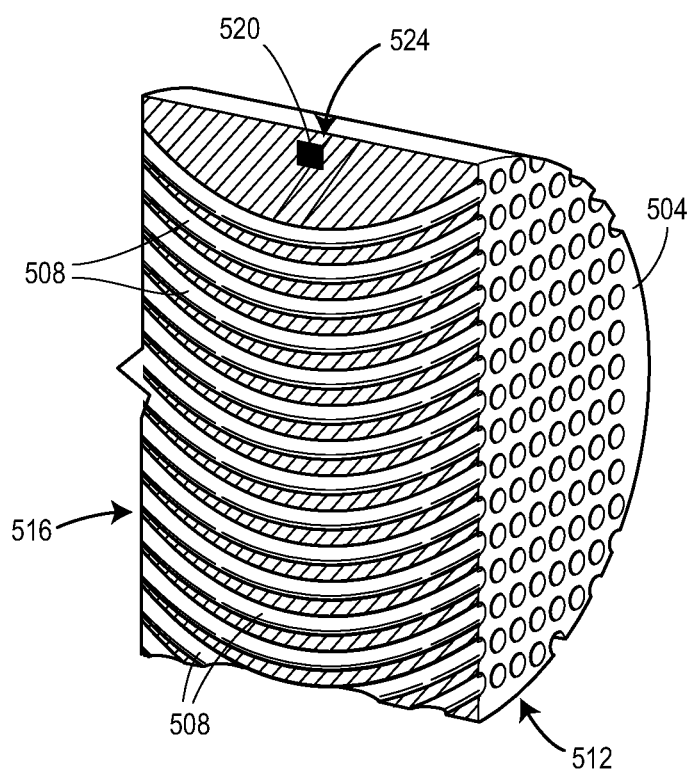
FIG. 5 is a cross-sectional view of a flame cell manufactured according to the process of FIG. 2 and including a plurality of curved channels.

FIG. 5 illustrates another example of a flame cell 500 custom manufactured using the method or process 200. The flame cell 500 has a substantially cylindrical body 504 and a plurality of channels 508 formed or defined in the body 504. Each of the channels 508 has a circular shape in cross-sectional and extends between a first end 512 of the flame cell 500 and a second end 516 of the flame cell 500 opposite the first end 512. As illustrated, each of the channels 508 is curved between the first and second ends 512, 516, such that the channels 508 define a curved, or non-linear, flow path. As discussed above, this curved, or non-linear, flow path advantageously promotes or induces turbulent flow so as to ensure adequate heat transfer from the flame front to the flame cell 500 as fluid flows through the flame cell 500. The flame cell 500 also includes a void 520 that is formed or defined in the body 504 during manufacturing and is sized to receive a sensor 524 (e.g., a temperature, photo, infrared, pressure, or other type of sensor). While not depicted herein, the sensor 524 can be communicatively connected (either via a wired connection or a wireless connection) to a controller, thereby allowing the controller and/or a user to remotely monitor the flame cell 500 without having to shut down the system employing the flame cell 500.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments.

Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. A method, comprising:
   forming a body of a flame cell by depositing successive layers of material between a first end of the body and a second end of the body,
   wherein each layer comprises one or more openings that form one or more channels between the first end and the second end,
   wherein the one or more channels are configured to permit fluid flow between the first end and the second end,
   wherein the body is configured to dissipate heat to prevent a propagation of a flame between the first end and the second end, and
   wherein at least one of the channels comprises an isolated channel between the first end and the second end, wherein the isolated channel is segregated from others of the one or more channels by the body.

2. The method of claim 1, further comprising positioning the flame cell and one or more additional flame cells within a housing.

3. The method of claim 2, wherein the housing comprises an inlet that is configured to be coupled to an inlet section of a pipeline and an outlet that is configured to be coupled to an outlet section of the pipeline.

4. The method of claim 1, wherein the isolated channel comprises a first one of the one or more openings at the first end and a second one of the one or more openings at the second end.

5. The method of claim 4, wherein the first one of the one or more openings and the second one of the one or more openings are aligned on an axis that extends between the first end and the second end.

6. The method of claim 5, wherein the isolated channel spirals about the axis between the first end and the second end.

7. The method of claim 1, wherein the one or more openings are substantially circular in cross-section.

8. The method of claim 1, wherein the act of forming the body further comprises forming a void within the body, wherein the void is configured to receive a sensor to measure one or more physical properties related to the body.

9. The method of claim 8, further comprising inserting the sensor within the void, the sensor comprising a temperature sensor.

10. A method, comprising:
    using an additive manufacturing technique to form a plurality of flame cell bodies, wherein the additive manufacturing technique comprises forming each flame cell body by:
    building successive layers between a first end and a second end of the flame cell body, wherein each layer comprises one or more openings that form one or more channels between the first end and the second end, wherein the one or more channels are configured to permit fluid flow between the first end and the second end, wherein the flame cell body is configured to dissipate heat to prevent a propagation of a flame between the first end and the second end, and wherein a first one of the channels in each flame cell body comprises a first one of the one or more openings at the first end and a second one of the one or more openings at the second end.

11. The method of claim 10, further comprising positioning the plurality of flame cell bodies within a housing to form a flame arrestor.

12. The method of claim 11, wherein the housing comprises an inlet that is configured to be coupled to an inlet section of a pipeline and an outlet that is configured to be coupled to an outlet section of the pipeline.

13. The method of claim 10, wherein the first one of the one or more openings and the second one of the one or more openings are centered on an axis that extends between the first end and the second end.

14. The method of claim 13, wherein the first one of the channels spirals about the axis between the first end and the second end.

15. The method of claim 10, wherein the one or more openings in each layer of each flame cell body are substantially circular in cross section.

16. A method of custom manufacturing a flame arrestor assembly configured to prevent a flame from propagating therethrough, the method comprising:
  creating a customized flame cell using an additive manufacturing technique, the creating comprising:
    forming a body; and
    forming one or more channels in the body, the one or more channels defining a flow path configured to transfer heat from a fluid to prevent a flame front from propagating through the flow path;
  providing a housing; and
  securely arranging the flame cell within the housing,
  wherein forming the one or more channels comprises forming one or more curved channels in the body such that the flow path is at least partially non-linear.

17. The method of claim 16, wherein creating the customized flame cell comprises forming a void in the body, the method further comprising arranging a sensor within the void.

* * * * *

UNITED STATES PATENT AND TRADEMARK OFFICE
CERTIFICATE OF CORRECTION

PATENT NO. : 11,596,820 B2
APPLICATION NO. : 16/737741
DATED : March 7, 2023
INVENTOR(S) : John D. Cockerham et al.

It is certified that error appears in the above-identified patent and that said Letters Patent is hereby corrected as shown below:

On the Title Page

At page 2, in Column 2, item (56), under "OTHER PUBLICATIONS", Line 18, "Reporton" should be -- Report on --.

At page 2, in Column 2, item (56), under "OTHER PUBLICATIONS", Line 20, "Reporton" should be -- Report on --.

In the Specification

At Column 2, Line 19, "and or" should be -- and/or --.

Signed and Sealed this
Thirtieth Day of April, 2024

Katherine Kelly Vidal
*Director of the United States Patent and Trademark Office*